United States Patent [19]

Kallin

[11] 4,185,587

[45] Jan. 29, 1980

[54] HOG FEEDER

[75] Inventor: Ingmar Kallin, Goshen, Ind.

[73] Assignee: Chore-Time Equipment, Inc., Milford, Ind.

[21] Appl. No.: 893,883

[22] Filed: Apr. 6, 1978

[51] Int. Cl.² ............................................. A01K 5/02
[52] U.S. Cl. ................................ 119/51.11; 119/56 R; 222/563
[58] Field of Search ................. 119/56 R, 52 AF, 53, 119/51.11; 222/563, 544, 509

[56] References Cited

U.S. PATENT DOCUMENTS

| | | | |
|---|---|---|---|
| 178,697 | 6/1876 | Winston | 222/563 |
| 954,346 | 4/1910 | Romero | 222/563 |
| 3,211,339 | 10/1965 | Piper et al. | 119/51.11 X |
| 3,230,933 | 1/1966 | Myers et al. | 119/53 |
| 3,990,402 | 11/1976 | Eriksson | 119/56 R |
| 4,031,857 | 6/1977 | Jones | 119/56 R |

*Primary Examiner*—Hugh R. Chamblee
*Attorney, Agent, or Firm*—Trexler, Wolters, Bushnell & Fosse, Ltd.

[57] ABSTRACT

Feeder apparatus is provided for delivering a pre-determined amount of feed to hogs and like livestock. The apparatus includes a feed transporting and dispensing conveyor with which are associated a plurality of feeder units; each unit receives and temporarily stores the feed. Each unit includes a feed receiver body. A boot extends from the body and defines a discharge opening. A pear-shaped stopper valve carried in the boot fits into and onto the discharge opening to obstruct the flow. A stopper valve pull system acts to draw the stopper valve away from the discharge opening, thereby permitting feed flow; if desired, this pull system can be connected to a timer so as to discharge the feed at a pre-selected moment. The stopper valve includes a semi-spheroidal element adapted to fit into and onto the discharge opening and a conical element adapted to be drawn through the feed pile so as to discourage feed bridging and hang-up within the feeder unit body. A discharge tube extending into the feeder unit body includes an extensible and retractable bellows member for varying the height of the feed pile to be collected within the feeder unit.

17 Claims, 4 Drawing Figures

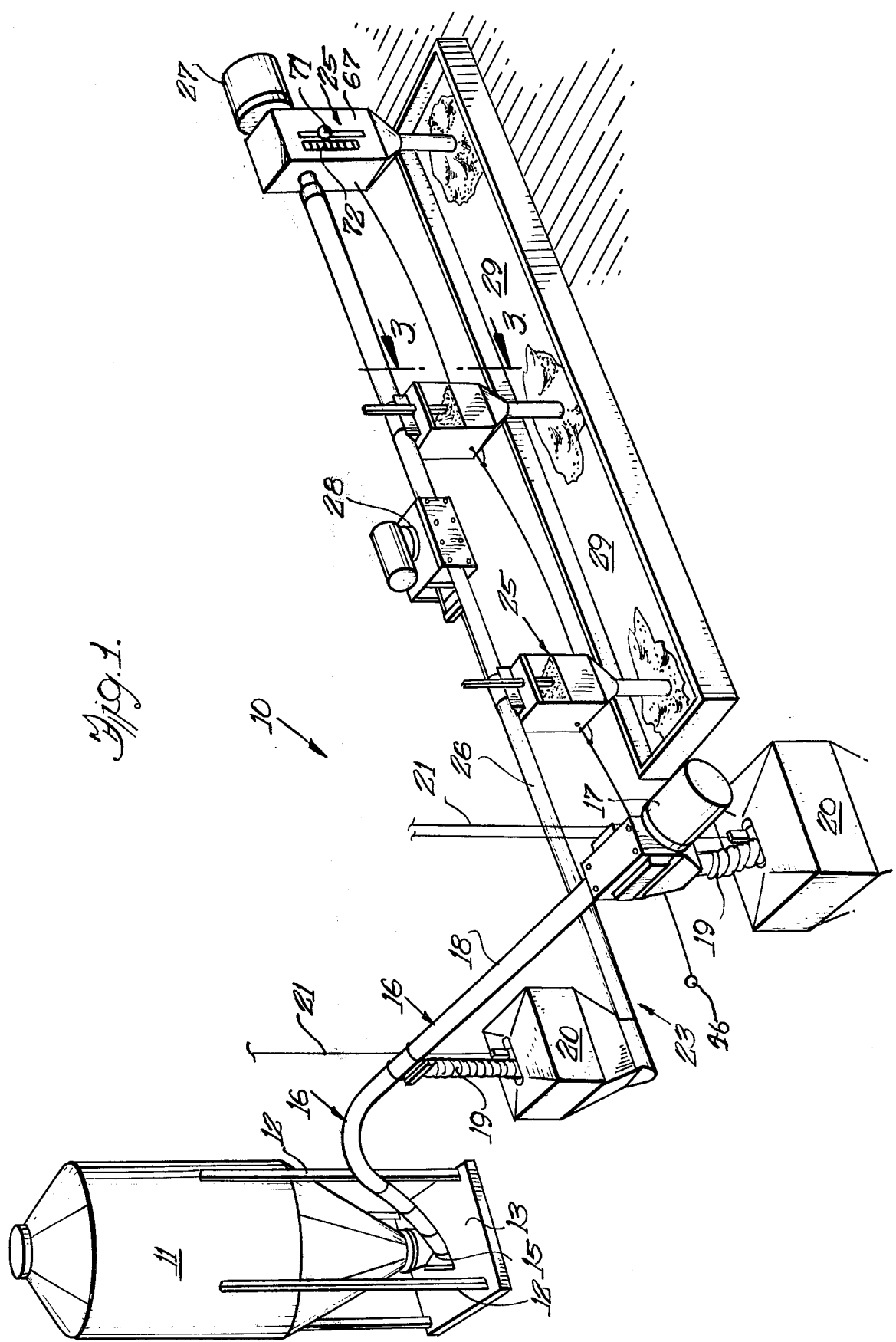

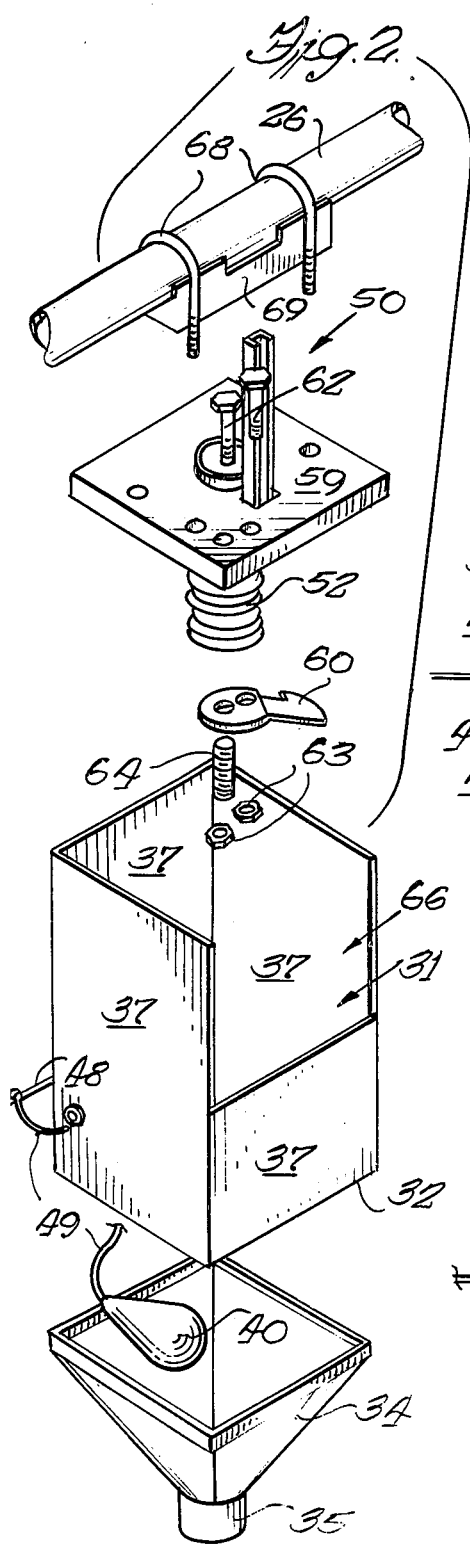
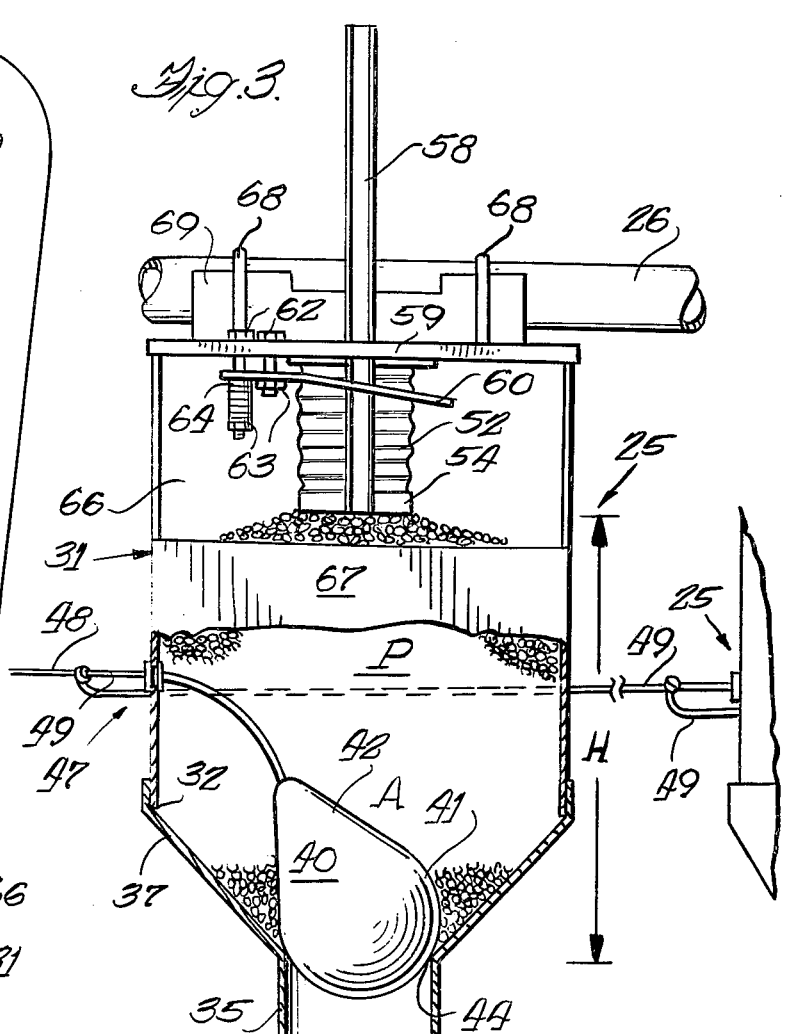
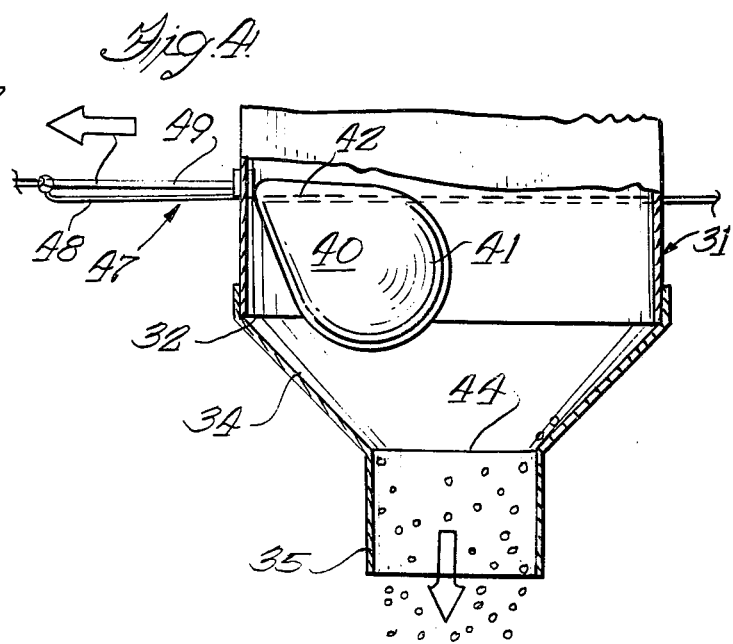

HOG FEEDER

BACKGROUND OF THE INVENTION

This invention relates generally to livestock feeding equipment, and more particularly concerns equipment for collecting, storing and quickly dispensing a premeasured amount of feed to hogs and like livestock.

U.S. Pat. No. 3,325,055 to Marshall notes that livestock such as hogs can be fed predetermined, limited amounts of feed at specified intervals so as to obtain increased efficiency of feed conversion and improvement in the quality of the animals. This approach to livestock husbandry has met with increasing commercial acceptance.

It is the general object of the present invention to provide a relatively inexpensive yet highly effective feeder which is especially adapted for use with hogs and like livestock.

More specifically, it is an object to provide a feeder which will receive, hold, and then quickly dispense relatively large amounts of feed to hogs and similar livestock. A related object is to provide a feeder having a feed-dispensing valve of reliable and rugged construction.

Another object is to provide such a feeder which accurately quantifies the amount of feed received and stored so as to permit close control of the livestock diet.

Still another object is to provide feed-dispensing apparatus having internally carried, relatively self-contained quantification and dispensing mechanisms.

A further object is to provide such feed-dispensing apparatus which can be used with a wide variety of feeds with equal facility.

Other objects and advantages of the invention will become apparent upon reading the following detailed description and upon reference to the drawings. Throughout the drawings, like reference numerals refer to like parts. cl BRIEF DESCRIPTION OF THE DRAWINGS FIG. 1 is a perspective view showing a feed transporting, receiving and dispensing system embodying and including the present invention;

FIG. 2 is an exploded view showing the feeder of the present invention;

FIG. 3 is a sectional view taken substantially in the plane of line 3—3 in FIG. 1 and showing in further detail the interior of the feeder;

FIG. 4 is a fragmentary elevational view in partial section somewhat similar to FIG. 3 but showing the feed-collecting and dispensing apparatus as it appears when feed is being dispensed from the receiver.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown a feed-dispensing and transport system 10 embodying the present invention. Generally speaking, feed is delivered to and preliminarily stored in a large bin 11, which can be mounted by posts 12 upon a foundation 13. This bin 11 can be located either inside or outside a livestock shed or house (not shown). Feed collected in a lower boot member 15 is drawn from the bin 11 by a conveyor 16, which here comprises an auger member (not shown) rotated, as by an electric motor 17 or other motive means, within a tube or pipe 18. Feed traveling along this conveyor 16 is dispensed through drop-pipes 19 to relatively large hoppers 20 which can be suspended in overhead positions from cables 21.

From this header conveyor 16 and the hoppers 20, one or more branch conveyors 23 draw feed for delivery to feeders 25 embodying several aspects of the present invention. Again, these branch conveyors 23 can include hollow tubes or pipes 26 within which are disposed auger members (not shown) for rotation by electric motors 27 or other motive power. Box mechanisms 28 can be provided to control feed flow over relatively long stretches of the branch conveyors 23. Feed is discharged from the feeder units 25 into one or more troughs 29 located for access by the livestock.

To inexpensively collect an accurately measured amount of livestock feed P, and then quickly dispense that feed P in accordance with the invention, the feeder 25 includes a body 31 for receiving and storing a flow of feed from the conveyor 26, and, extending from the body bottom 32, a boot member 34 as shown in FIGS. 2-4. Accurate control of the flow of feed from the feeder 25 is encouraged by a discharge chute 35. To encourage rapid and complete feed flow from the body 31, this boot 34 and the chute 35 can be integrally made of a plastic resin having a smooth surface finish. This one-piece boot 34 encourages quick and even feed flow through the discharge chute 35, and discourages feed bridging action and hang-up phenomena within the dispenser 25 when feed is to be discharged. The body 31 has a square cross section to provide a compact feeder shape and to provide a linear scale or relationship between the height of the feed pile P stored within the feeder 25 and the amount of feed mass in the stored pile. Further, this constant-size cross-sectional shape permits the body walls 37 to be oriented substantially vertically so as to encourage feed flow from the feeder 25.

In accordance with another aspect of the invention, feed flow from the dispenser 25 is controlled by a novel stopper valve 40. This stopper valve element 40 can be considered to be generally pear-shaped, and includes a substantially semi-spheroidal bottom element 41 integrally formed with a conical top element 42. As more particularly shown in FIGS. 3 and 4, the semi-spheroidal bottom element 41 fits snugly yet securely within a discharge opening 44 which defines the mouth of the discharge chute 35. Thus, although the stopper element 40 may come to rest in any one of a relatively large variety of positions in and upon the discharge opening 44, complete feed flow-halting action is afforded.

It is a feature of this invention that the stopper element 40 encourages complete, rapid feed discharge from the feeder 25 when the stopper 40 is drawn away from the discharge opening 44 into the position shown, for example, in FIG. 4. To accomplish this, the stopper 40 is attached to a stopper pull system 47, which here comprises a main flexible pull cable 48 to which are connected a series of branch lines 49. This stopper pull system 47 permits the stopper 40 in each of a series of feeders to be pulled away from the associated discharge opening 44 and the chute 35, thereby permitting simultaneous discharge actions from a number of feeders 25 into the trough 29. Another feature of the invention includes a timer pull mechanism 46 attached to the main interconnector cable 48 to pull the stoppers and release the feed on all the units 25 at a preselected time.

It is another feature of the invention that the stopper 40 itself encourages complete feed discharge when it is moved away from the discharge opening 44 as shown in FIG. 4. As the stopper 40 is dragged away from the discharge opening 44 by the pull system 47, the stopper cone element 42 is drawn through the collected feed, thereby breaking up and further discouraging any feed bridging action which might otherwise occur. In carrying out the invention, feed is prohibited from collecting atop the stopper element 40 by forming the cone base angle A so as to be greater (and thus produce a taller or sharper cone 42) than the angle of repose of the feed normally carried in the dispenser 25. It is contemplated that the stopper element 40 will be formed of wood or other suitable material which is relatively unaffected by feed abraiding action, and which provides sufficient weight to cause the stopper 40 to return to the feed-flow-stopping position in and on the opening (as shown in FIG. 3) when tension upon the stopper pull system 47 is released. Alternatively, the stopper 40 can be offered at surprisingly low cost by forming the stopper as a hollow, plastic element weighted internally with sand or other weighting material to assure proper stopper seating after each discharge cycle.

In accordance with another aspect of the invention, the height H of the feed pile P developed within the feeder 25 can be easily and quickly adjusted, so as to permit a greater or lesser amount of feed to be delivered to the livestock in accordance with carefully calculated livestock feeding plans. To this end, a feed drop mechanism 50 extends from the feed conveyor tube 26 and into the feeder body 31. Here, this feed drop tube mechanism 50 includes a bellows member 52 which can be collapsed or extended so as to adjust the effective drop tube height over a relatively extended range of positions. As can be envisioned from FIG. 3, when the bellows 52 is retracted and a bellows mouth member 54 is correspondingly raised, a feed pile P of relatively greater height H is collected within the dispenser receiver body 31. After feed has risen to the height of the drop tube mouth member 54, additionally delivered feed collects, or backs up, within the bellows 52 until the feed back-up action reaches the conveyor 26.

When the feeder 25 is thus effectively filled, feed within the conveyor tube 26 simply moves past the filled feeder to other downstream feeders, as can be envisioned from FIG. 1. If, however, the bellows is extended so as to locate the bellows mouth member 54 at a relatively lower position, a relatively shorter pile P of feed will be collected within the feeder body 31 before feed back-up collecting action begins to occur within the extended bellows 52. Thus, a smaller amount of feed will be retained for dispensing to the livestock.

Pursuant to this aspect of the invention, the bellows member 52 can be extended, and the bellows mouth member 54 can be located and retained at any one of an extended vertical range of positions. To this end, an interconnector member—here, a rod 58—extends from the mouth member 54 through a roof member 59 atop the receiver body 31. A latch element 60 is resiliently and pivotally mounted to the roof 59, as by bolts 62, nuts 63 and an appropriate biasing spring 64. This latch 60 can be reached through a normally open observation area 66 provided in one side 67 of the receiver body 31. When the latch 60 is withdrawn from contact with the rod 58, the rod can be moved upwardly or downwardly so as to correspondingly reposition the bellows mouth member 54 and correspondingly adjust the effective height of the bellows drop tube element 52. U-bolts 68 and a carriage member 69 serve to connect the feeder roof 59 and remaining portions of the feeder to the conveyor tube 26. If desired, a bellows mouth position indicator 71 and a feed supply indicating scale 72 can be provided on the feeder side 67 (FIG. 1) to permit the livestock husbandman to quickly, easily and accurately adjust the feeder 25 so as to receive and retain a predetermined precise amount of feed. If desired, additional indicators can be fixed to the rod 58 on each individual feeder unit 25 to permit individual unit adjustment so as to provide the correct amount of feed at each location.

The invention is claimed as follows:

1. A feeder for livestock and the like, comprising, in combination, feed receiver body means for receiving and storing a flow of feed, boot means extending from the receiver means and defining a discharge opening, stopper valve means carried in the boot means, the stopper valve means including a pear-shaped member, the pear-shaped member having a substantially semi-spheroidal bottom element adapted to fit within and upon the boot discharge opening and a conical top element adapted to prevent feed from collecting upon the stopper top and to disturb feed bridging action within the receiver and dispenser as the stopper member is pulled away from the discharge opening, and stopper actuator means attached to the stopper valve means to permit the stopper valve means to be pulled away from the discharge opening, thereby permitting feed discharge action from the feeder.

2. A feeder according to claim 1 wherein said stopper valve top element is a cone having a base angle greater than the angle of feed pile repose.

3. A feeder according to claim 1 wherein said stopper valve means is sufficiently heavy to cause the stopper valve means to return to its covering position in and upon said discharge opening upon release of the stopper actuator means.

4. A feeder according to claim 3 wherein said stopper valve means includes a hollow resinous plastic element filled with weighting material.

5. A feeder according to claim 1 including a feed discharge chute depending from said boot member at the discharge opening.

6. A feeder according to claim 5 wherein said boot means and discharge chute are formed as a unit, together defining the discharge opening, and together having a smooth interior surface to encourage rapid, smooth, unobstructed feed flow through the boot, the discharge opening and the chute.

7. A feeder according to claim 1 wherein said stopper actuator means includes a pull cord connected to said stopper valve means and extending to a point outside said feeder to permit the stopper valve means to be pulled away from the discharge opening.

8. A feeder according to claim 1 wherein said feed receiver body means is formed with a cross-sectional aspect of constant size and magnitude so as to provide a generally linear relationship between the height of the feed pile contained within the feed receiver and the mass of feed stored within the receiver, and to provide body walls which are oriented substantially vertically so as to encourage feed flow from the feeder.

9. A feeder according to claim 1 including feed-transporting conveyor means operatively connected to the receiver body means so as to deliver a flow of feed to the receiver body means.

10. A feeder according to claim 1 including feed drop tube means extending from a feed conveyor means and into the feed receiver body means, the feed drop tube means including a bellows member permitting the effective drop tube height to be adjusted, thereby permitting the amount of the feed received and stored in the receiver body means and boot means to be correspondingly adjusted.

11. A feeder according to claim 10, including bellows mouth member located at the bellows member mouth, interconnector means extending from the bellows mouth member, and latch means positioned to engage the interconnector means at any one of a range of positions so as to correspondingly locate the bellow mouth and regulate the effective length of the bellows member and drop tube means.

12. A feeder according to claim 10 including a roof member mounted atop the feed receiver body means, and wherein said interconnector member includes a rod extending through the roof, and wherein said latch member is carried by the roof.

13. Feeding apparatus comprising, in combination, an elongated feed-transporting and dispensing conveyor, a plurality of feeder units associated with the conveyor for receiving a flow of feed from the conveyor, and for temporarily storing the received feed, each feeder unit including a feed receiver body for receiving and storing a flow of feed from the conveyor means, boot means extending from the receiving body means and defining a discharge opening, and stopper valve means carried in the boot means and adapted to be moved away from the discharge opening, thereby permitting feed discharge action from the receiver, the stopper valve means including a pear-shaped member having a substantially semi-spheroidal bottom element adapted to fit within and upon the boot discharge opening, and a conical top element adapted to prevent feed from collecting upon the stopper top and to disturb feed bridging action within the receiver and dispenser as the stopper member is pulled away from the discharge opening, the feeding apparatus further comprising stopper valve pull means extending from the stopper valve means in each feeder unit for moving the stopper valve means away from the discharge opening, and a pull means interconnector connecting the stopper valve pull means in one feeder unit with the stopper valve pull means in at least one other feeder unit so as to permit the interconnected stopper valve pull means in the units to be simultaneously pulled away from their respective discharge openings and provide a plurality of simultaneous feed discharges.

14. Feeding apparatus according to claim 13 including timer actuated pull means connected to the interconnector means for pulling the interconnector means at a pre-set time.

15. Feed dispensing apparatus comprising, in combination, a feed conveyor, and a feeder unit including a feed receiver body means for receiving and storing a flow of feed from the conveyor, boot means extending from the receiver body means, stopper valve means associated with the boot means for controlling the discharge of feed from the receiver body means, the stopper valve means including a pear-shaped member having a substantially semi-spheroidal bottom element adapted to fit within and upon the boot discharge opening, and a conical top element adapted to prevent feed from collecting upon the stopper top and to disturb feed bridging action within the receiver and dispenser as the stopper member is pulled away from the discharge opening, and feed drop tube means extending from the feed conveyor and into the feed receiver body means, the feed drop tube means including a mouthed bellows member permitting the effective drop tube height to be adjusted, thereby permitting the amount of the feed received and stored in the receiver body means to be correspondingly adjusted.

16. Feed dispensing apparatus according to claim 15 including interconnector means attached to said bellows member and adapted to locate the bellows member mouth at any one of a range of positions so as to correspondingly regulate the effective length of the bellows member and drop tube means, and correspondingly adjust the height of the pile of feed collected and stored within the feed receiving and dispensing means.

17. Feed receiving and dispensing apparatus according to claim 15 wherein said boot means defines a feed discharge opening, and wherein said valve means includes a stopper member carried within the boot and receiver body means and adapted to fit in and upon the feed discharge opening and to be removed therefrom so as to correspondingly obstruct and permit a discharge flow of feed from the feeder unit.

* * * * *